US008262286B2

(12) United States Patent
Peterson et al.

(10) Patent No.: US 8,262,286 B2
(45) Date of Patent: Sep. 11, 2012

(54) DIGITAL OUTPUT TEMPERATURE SENSOR

(75) Inventors: Luverne R. Peterson, San Diego, CA (US); James R. Welch, Corcoran, MN (US)

(73) Assignee: Toshiba America Electronic Components, Inc., Irvine, CA (US)

( * ) Notice: Subject to any disclaimer, the term of this patent is extended or adjusted under 35 U.S.C. 154(b) by 967 days.

(21) Appl. No.: 12/273,031

(22) Filed: Nov. 18, 2008

(65) Prior Publication Data

US 2010/0124251 A1    May 20, 2010

(51) Int. Cl.
*G01K 7/00*      (2006.01)
(52) U.S. Cl. .................. 374/170; 374/171; 327/512
(58) Field of Classification Search .............. 374/170, 374/171, 178, 1, E7.001; 327/512, 513; 702/99, 702/130, 132, 136
See application file for complete search history.

(56) References Cited

U.S. PATENT DOCUMENTS

| | | | | |
|---|---|---|---|---|
| 6,480,127 | B1 * | 11/2002 | Aslan | 341/119 |
| 7,253,598 | B1 * | 8/2007 | Doyle et al. | 323/316 |
| 7,372,244 | B2 * | 5/2008 | Marinca | 323/316 |
| 7,474,230 | B2 * | 1/2009 | Blom et al. | 340/870.04 |
| 7,780,346 | B2 * | 8/2010 | Chellappa | 374/178 |
| 2005/0001670 | A1 * | 1/2005 | Kim et al. | 327/512 |
| 2006/0190210 | A1 * | 8/2006 | Mukherjee | 702/130 |
| 2007/0098041 | A1 * | 5/2007 | Seo | 374/170 |
| 2010/0156477 | A1 * | 6/2010 | Chellappa | 327/143 |
| 2010/0164465 | A1 * | 7/2010 | Yang | 323/313 |
| 2011/0169551 | A1 * | 7/2011 | Stanescu et al. | 327/512 |

OTHER PUBLICATIONS

Maxim; IC Temperature Sensors Find the Hot Spots; Application Note 689: Jan. 31, 2001.
IC Thermal Sensors Simplify Your Design; Sensor Technology and Design Magazine; Nov. 2004.
Digital Temperature Sensors: Help for Hot Boards; Sensor Technology and Design Magazine; Jan. 2004.
A Switched Current, Switched Capacitor Temperature Sensor in 0.6u CMOS. Mike Tuthill.
Micropower CMOS Temperature Sensor with Digital Output; A. Bakker & J. Huijsing; IEEE Journal of Solid-State Circuits; vol. 31, No. 7, Jul. 1996.
A Time-to-Digital-Converter-Based CMOS Smart Temperature Sensor; IEEE Journal of Solid State Circuits, vol. 40, No. 8, Aug. 2005.

* cited by examiner

*Primary Examiner* — R. A. Smith
(74) *Attorney, Agent, or Firm* — Tucker Ellis LLP

(57) ABSTRACT

A temperature sensor generates a digital output signal representative of the absolute temperature of the sensor. The sensor includes a first circuit configured to generate a complementary to absolute temperature (CTAT) voltage signal and a second circuit configured to generate a proportional to absolute temperature (PTAT) current signal. A comparator receives the CTAT and PTAT signals and generates a comparison signal based on a comparison between the signals. A converter circuit receives the comparison signal and generates a digital output signal based on the comparison signal. The digital output signal is representative of the temperature of the sensor.

16 Claims, 12 Drawing Sheets

DIGITAL OUTPUT TEMPERATURE SENSOR

BACKGROUND

This application is related generally to temperature sensing and, more specifically, to methods and apparatus for sensing a temperature and generating a digital output proportional to the sensed temperature. The preferred embodiments will be described with reference to example circuits and with reference to example method steps. However, it is to be understood that the claimed embodiments may be implemented in a wide variety of forms, components and method steps and therefore is not limited to the example preferred embodiments. As an example, other equivalent circuits and steps may be used to sense a temperature and generate a digital output proportional to the sensed temperature, and the applications may include differential temperature sensing.

FIG. 1 is a functional block diagram illustrating a basic temperature sensing circuit 10 in accordance with the prior art. As shown, in general, the temperature is determined by comparing the output of a temperature dependent voltage generating circuit 12 with a substantially temperature independent reference voltage generating circuit 14. More particularly, a complementary to absolute temperature (CTAT) circuit 16 generates a CTAT voltage signal V1 and a fixed voltage generating circuit 18 generates a reference voltage V2. A comparator circuit 20 is included in the basic temperature sensing circuit 10 together with an offset circuit 22 and an error correction circuit 24.

As shown in FIG. 2, in general, the CTAT voltage signal V1 varies substantially linearly with changes in temperature and, more particularly, decreases for temperature increases. The negative slope of the CTAT voltage signal V1 is typically about 200-300 mV over about 150° C. or about 1.6 mV/° C. In the illustrated prior art example, the temperature circuit 10 is operational in the box bounded by $v_1$, $v_2$, $t_1$, and $t_2$.

In operation and with reference to both FIGS. 1 and 2, the basic prior art circuit 10 generates a temperature output signal 26 based on an amount of offset needed to be added to the reference voltage V2 so that a sum of the offset voltage V3 and the reference voltage V2 at a first input 28 to the comparator circuit 20 matches the level of the CTAT voltage signal V1 at the second input 30 to the comparator circuit 20. Essentially, the output signal 26 is proportional to the amount of offset needed to be added to the reference voltage V2. At a nominal temperature $t_{nom}$ in the example shown no offset is needed so the reference voltage V2 is presented directly at the first input 28 and the temperature output signal 26 is proportional to an offset value of zero. At the low temperature extreme $t_1$ in the example shown the offset needed to be added to the reference voltage V2 is ($v_2$-V2) and the output signal 26 generated is proportional to ($v_2$-V2). At the high temperature extreme $t_2$ in the example shown the offset needed to be added to the reference voltage V2 is ($v_1$-V2) and the output signal 26 generated is proportional to ($v_1$-V2).

Basic temperature sending circuits of the type described above perform adequately for some applications. However, the range of the output V1 of the temperature dependent circuit 12 such as between v1 and v2 in the example is relatively small making the circuit generally sensitive to changes such as drifting etc. in the temperature independent reference voltage circuit. Small changes in V2 produce inaccurate results.

Overall, for a temperature range of interest, it is desired to maximize the change of the temperature dependent voltage signal V1 relative to the temperature independent reference voltage V2. Graphically it is desirable to maximize the angle of incidence A between the temperature dependent voltage signal V1 and the temperature independent reference voltage V2. However, the range of the output V1 of the temperature dependent circuit 12 such as between v1 and v2 results in a relatively small angle making the temperature sensor circuit sensitive.

In addition, the output V2 from the reference voltage circuit 14 is in practice temperature dependent. In that regard, typically, the slope of the output V2 is slightly negative. This further reduces the angle of incidence A, making the circuit less precise.

BRIEF SUMMARY OF THE EMBODIMENTS

In accordance with the embodiments there are described herein temperature sensor methods and apparatus that provide the ability to accurately measure temperature and generate a digital output proportional to the sensed temperature.

In one example embodiment, a digital output temperature sensor comprises a first circuit configured to generate a first signal, the first signal varying complementary to a temperature of the sensor, a second circuit configured to generate a second signal, the second signal varying proportionally to the temperature of the sensor, a comparator operatively associated with the first and second circuits and configured to receive the first and second signals and generate a comparison signal based on a comparison between the first and second signals, and a converter circuit operatively associated with the comparator and configured to receive the comparison signal and generate a digital output signal based on the comparison signal, the digital output signal being representative of the temperature of the sensor.

In another example embodiment, a digital output temperature sensor comprises a first circuit configured to generate a complementary to absolute temperature (CTAT) voltage signal as a first signal, the first circuit using a pair of stacked diodes to generate the first signal, a reference circuit configured to generate a reference signal, the reference signal being substantially independent of the temperature of the sensor, a comparator operatively associated with the first circuit and the reference circuit and configured to receive the first and reference signals and generate a comparison signal based on a comparison between the first and reference signals, and a converter circuit operatively associated with the comparator and configured to receive the comparison signal and generate a digital output signal based on the comparison signal, the digital output signal being representative of the temperature of the sensor.

In yet another example embodiment, a method in a temperature sensor of sensing a temperature comprises generating a first signal varying complementary to a temperature of the sensor, generating a second signal varying proportionally to the temperature of the sensor, generating a comparison signal based on a comparison between the first and second signals, and generating a digital output signal based on the comparison signal, the digital output signal being representative of the temperature of the sensor.

In accordance with yet a further example embodiment a method in a temperature sensor of sensing a temperature comprises using a pair of stacked diodes, generating a complementary to absolute temperature (CTAT) voltage signal as a first signal, generating a reference signal, the reference signal being substantially independent of the temperature of the sensor, generating a comparison signal based on a comparison between the complementary to absolute temperature (CTAT) voltage signal and reference signals, and generating a digital output signal based on the comparison signal, the digital output signal being representative of the temperature.

Many advantages, aspects, and objects of the embodiments will become readily apparent to those skilled in this art from the following description wherein there is shown and described preferred embodiments, simply by way of illustration of at least one of the best modes to carry out the embodiments. As it will be realized, the examples are capable of other different embodiments and the several details are capable of modifications in various obvious aspects all without departing from the scope of the appended claims. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the example embodiments, and together with the description serve to explain the principles of the embodiments.

DETAILED DESCRIPTION OF EMBODIMENTS

Throughout this description, the preferred embodiments shown should be considered as exemplars, rather than limitations.

Figure 1:
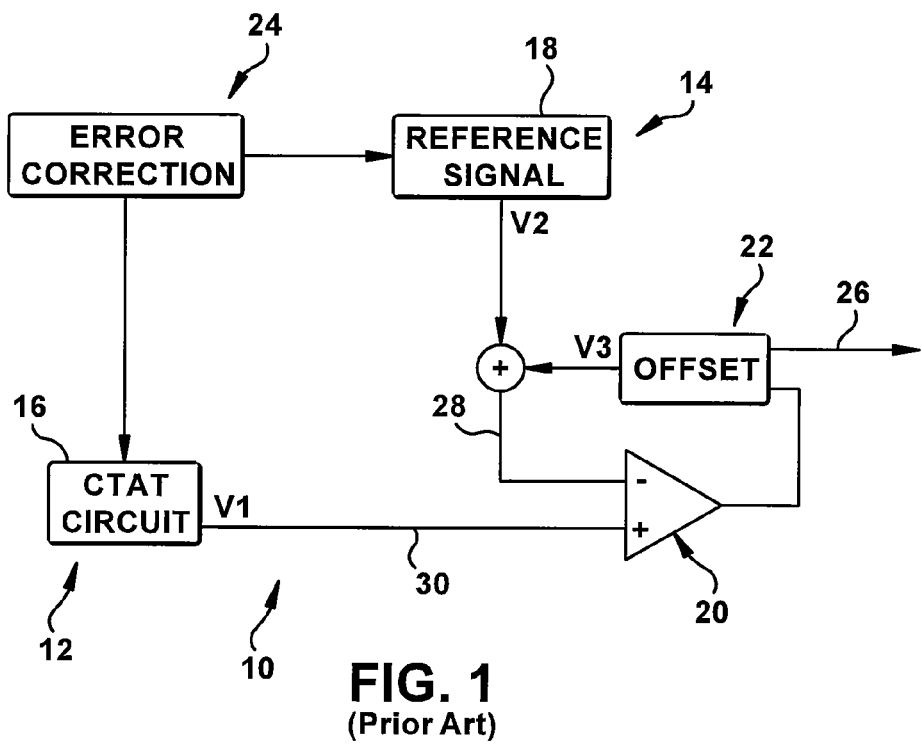
FIG. 1 is a block diagram of a temperature sensing circuit in accordance with the prior art.
Figure 2:
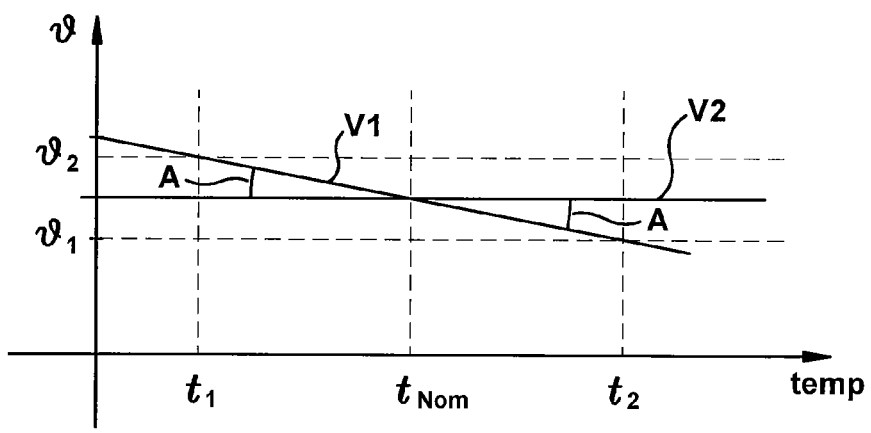
FIG. 2 is a graph showing a voltage versus temperature characteristic of the prior art circuit of FIG. 1.
Figure 3:
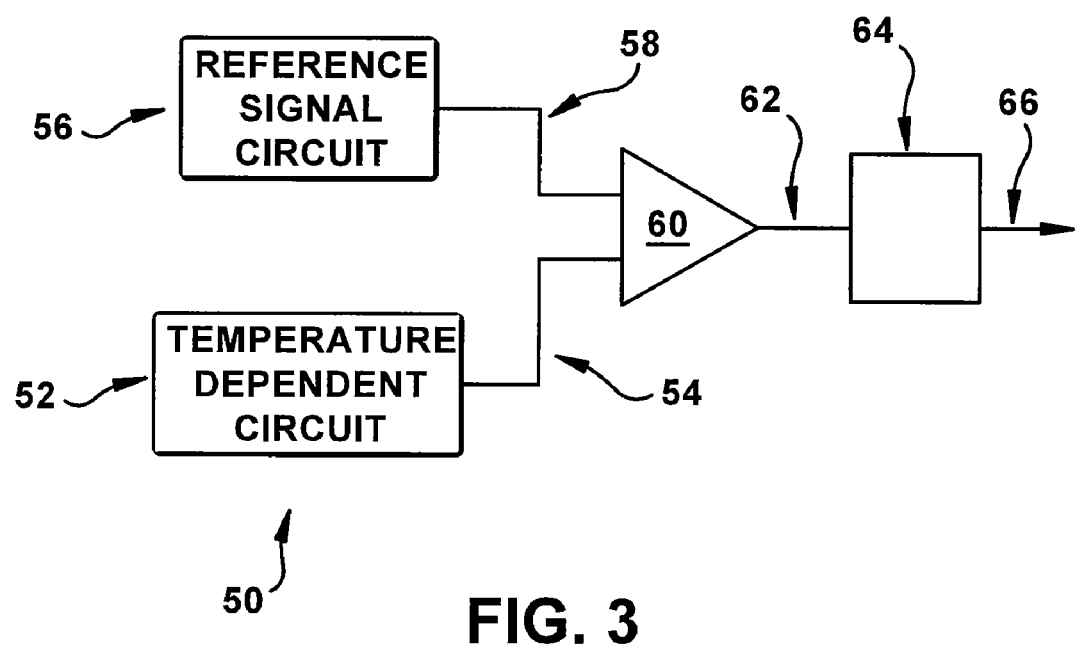
FIG. 3 is a simplified block diagram of a temperature sensing system in accordance with an embodiment of the present invention.

With reference first to FIG. 3, a digital output temperature sensor 50 in accordance with an example embodiment is shown in a simplified block diagram form. The digital output temperature sensor 50 includes a temperature dependent circuit 52 configured to generate a first output 54 varying complementary to a temperature of the sensor and a reference signal circuit 56 configured to generate a reference signal 58. A comparator 60 is operatively connected with the temperature dependent circuit 52 and with the reference signal circuit 56, and is configured to receive the first and reference signals 54, 58 for generating a comparison signal 62 based on a comparison between the first and reference signals 54, 58. In addition, a converter circuit 64 is operatively connected with the comparator 60 and is configured to receive the comparison signal 62 and generate a digital output signal 66 based on the comparison signal 62. The digital output signal 66 is representative of the temperature of the sensor 50.

Figure 4A:
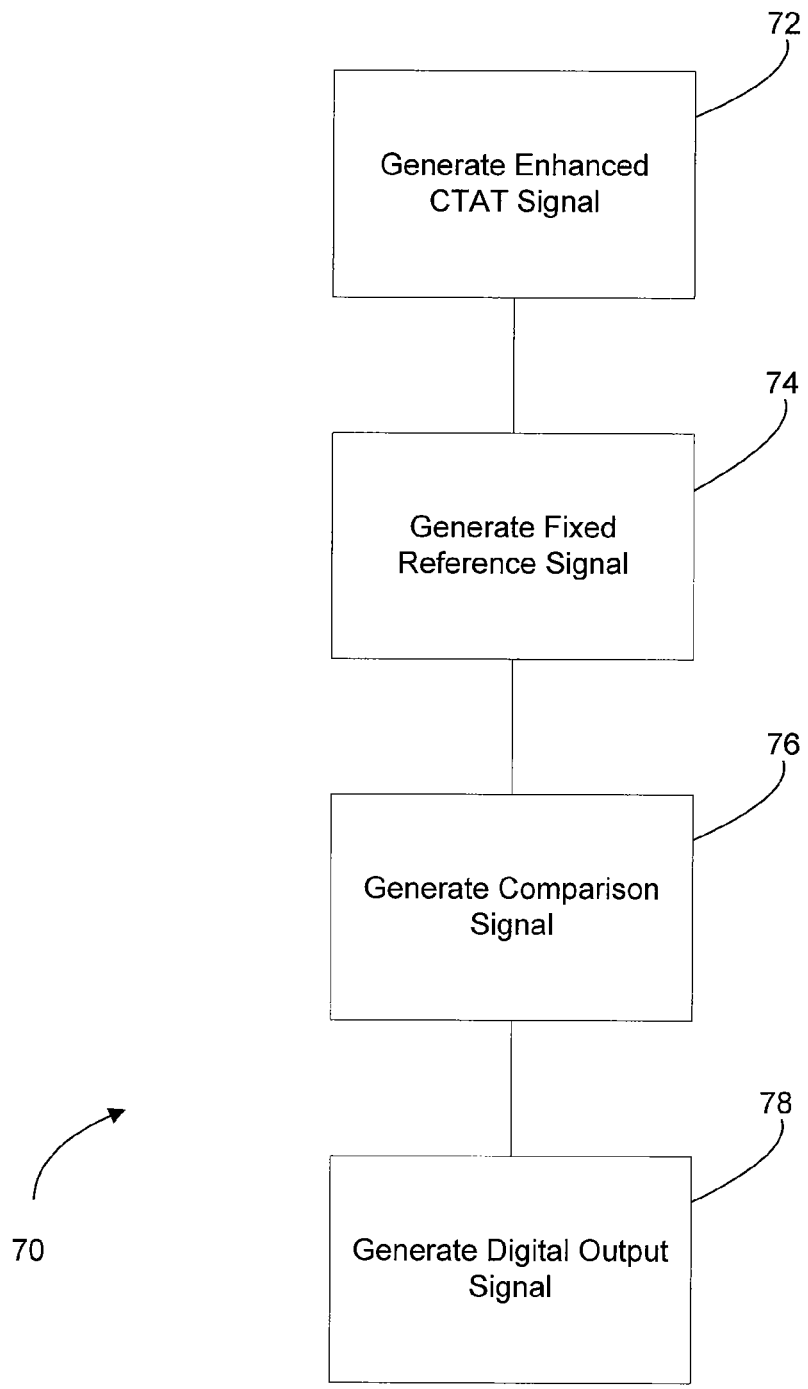
FIGS. 4a-4c are flow diagrams showing methods of operating the temperature sensing system of FIG. 3 in example embodiments.
Figure 5A:
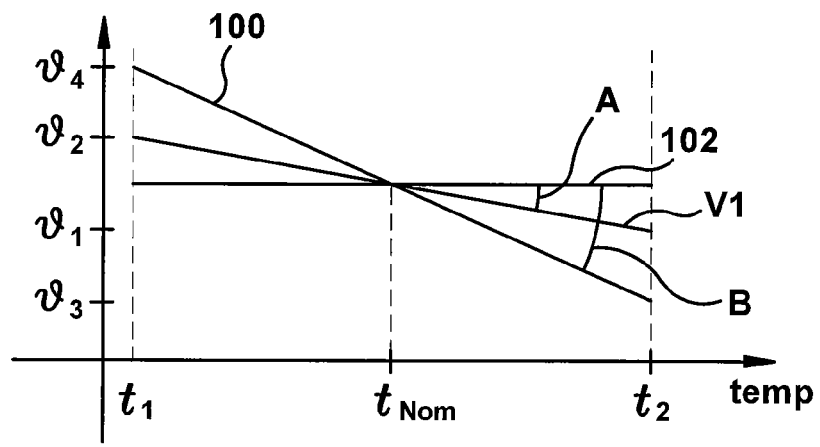
FIGS. 5a-5c are graphs showing voltage versus temperature characteristics of the temperature sensing system of FIG. 3 when operated in the modes of FIGS. 4a-4c.

FIGS. 4a and 5a show a method of operating the sensor 50 and a voltage versus temperature characteristic graph, respectively, in accordance with a first embodiment. Although steps are depicted in a particular order in the FIGURES and subsequent flowcharts, it is to be appreciated that the steps can be performed in a different order, overlapping in time or, in a preferred embodiment, simultaneously. The method 70 includes a step of generating 72 an enhanced complementary to absolute temperature (CTAT) voltage signal 100 using the temperature dependent circuit 52. In this embodiment, preferably, the temperature dependent circuit 52 includes a pair of stacked diodes for generating the enhanced CTAT voltage signal in a manner to be described in greater detail below. Using the reference signal circuit 56, a reference signal 102 is generated at step 74. In this embodiment, preferably, the reference signal 102 is substantially independent of the temperature of the sensor 50. In step 76, using the comparator 60, a comparison signal is generated based on a comparison between the enhanced CTAT voltage signal and reference signal. A digital output signal representative of the temperature of the sensor 50 is generated at step 78 based on the comparison signal.

As shown best in FIG. 5a, in general, the enhanced CTAT voltage signal 100 varies substantially linearly with changes in temperature and, more particularly, decreases for temperature increases. The negative slope of the enhanced CTAT voltage signal 100 of this embodiment is about 700 mV over about 150° C. or about −4.6 mV/° C.

FIG. 5a shows the enhanced CTAT voltage signal 100 overlaid with the standard CTAT voltage signal V1 of the prior art. As can be seen, in the illustrated prior art example, the temperature circuit 10 is operational in the box bounded by $v_1$, $v_2$, $t_1$, and $t_2$. However, in accordance with an embodiment of the present application, the temperature sensor has an enhanced operational range to include at least the area bounded by the box $v_3$ $v_4$, $t_1$, and $t_2$. In addition, the angle of incidence B between the enhanced CTAT voltage signal 100 and the reference voltage signal 102 is significantly greater than the angle of incidence A in the prior art between the temperature dependent standard CTAT voltage signal V1 and the fixed reference voltage. This provides an improved sensitivity in the subject temperature sensor 50 and enhances its robustness for use in a wide range of applications.

Figure 4B:
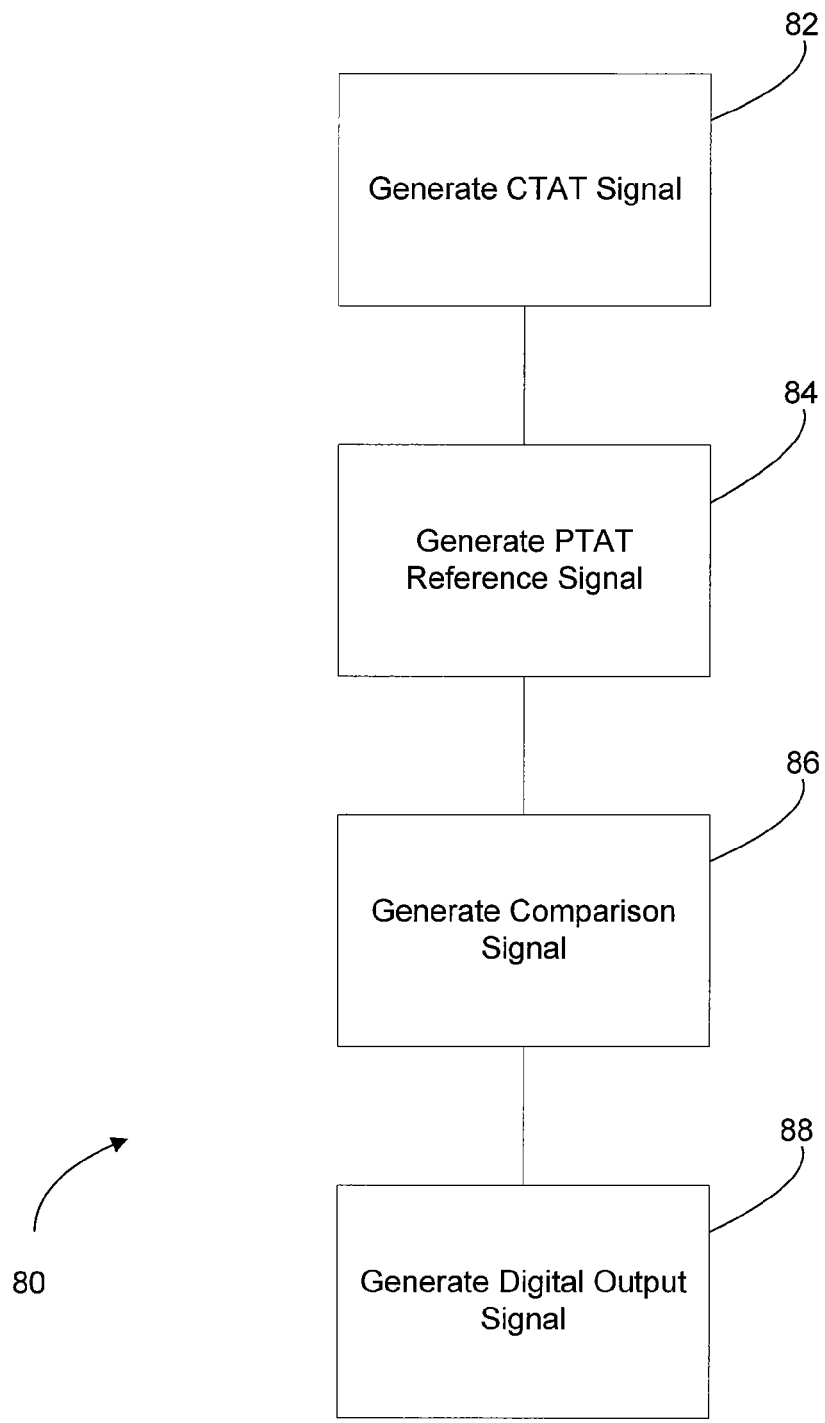
Figure 5B:
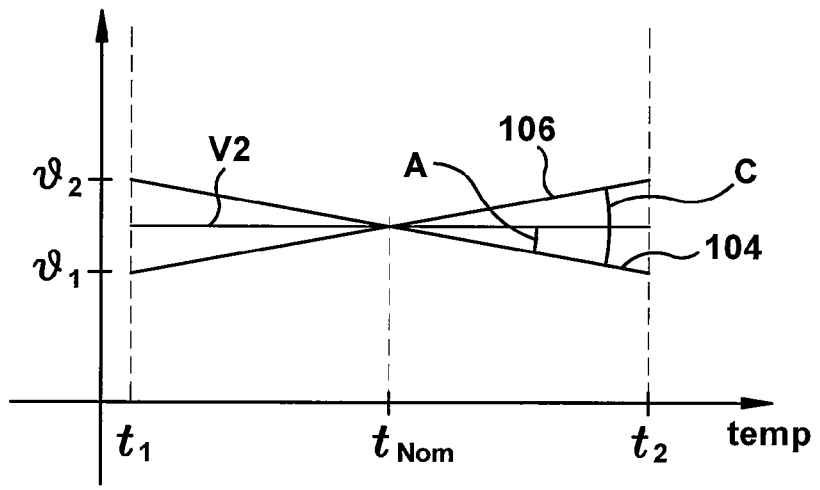

FIGS. 4b and 5b show a method of operating the sensor 50 and a voltage versus temperature characteristic graph, respectively, in accordance with a further embodiment. The method 80 includes a step of generating 82 a CTAT voltage signal 104 using the temperature dependent circuit 52. Using the reference signal circuit 56, a temperature dependent reference signal 106 is generated at step 84. In this embodiment, preferably, the reference signal 106 varies proportionally to the absolute temperature (PTAT) of the sensor 50. In step 86, using the comparator 60, a comparison signal is generated based on a comparison between the CTAT voltage signal 104 and the PTAT reference signal 106. A digital output signal representative of the temperature of the sensor 50 is generated at step 88 based on the comparison signal.

As shown best FIG. 5b, in general and as described above in the background, the CTAT voltage signal 104 varies substantially linearly with changes in temperature and, more particularly, decreases for temperature increases. The negative slope of the CTAT voltage signal 104 of this embodiment is about 200-300 mV over about 150° C. or about −1.6 mV/° C. However, the PTAT reference signal 106 varies substantially linearly with changes in temperature and, more particularly, increases with temperature increases. The positive slope of the PTAT reference voltage signal 106 of this embodiment is about 200-300 mV over about 150° C. or about +1.6 mV/° C.

FIG. 5b shows the PTAT reference signal 106 overlaid with the standard fixed reference voltage signal V2 of the prior art. As can be seen, in the illustrated prior art example, the temperature circuit 10 is operational substantially in the region of a box bounded by $v_1$, $v_2$, $t_1$, and $t_2$. However, in accordance with this embodiment of the present application, the temperature sensor has enhanced sensitivity and robustness because the angle of incidence C between the CTAT voltage signal 104 and the PTAT reference voltage signal 106 is significantly greater than the angle of incidence A in the prior art between the temperature dependent CTAT voltage signal and the fixed reference voltage V2. Again, this provides an improved sensitivity in the subject temperature sensor 50 and enhances its robustness for use in a wide range of applications.

Figure 4C:
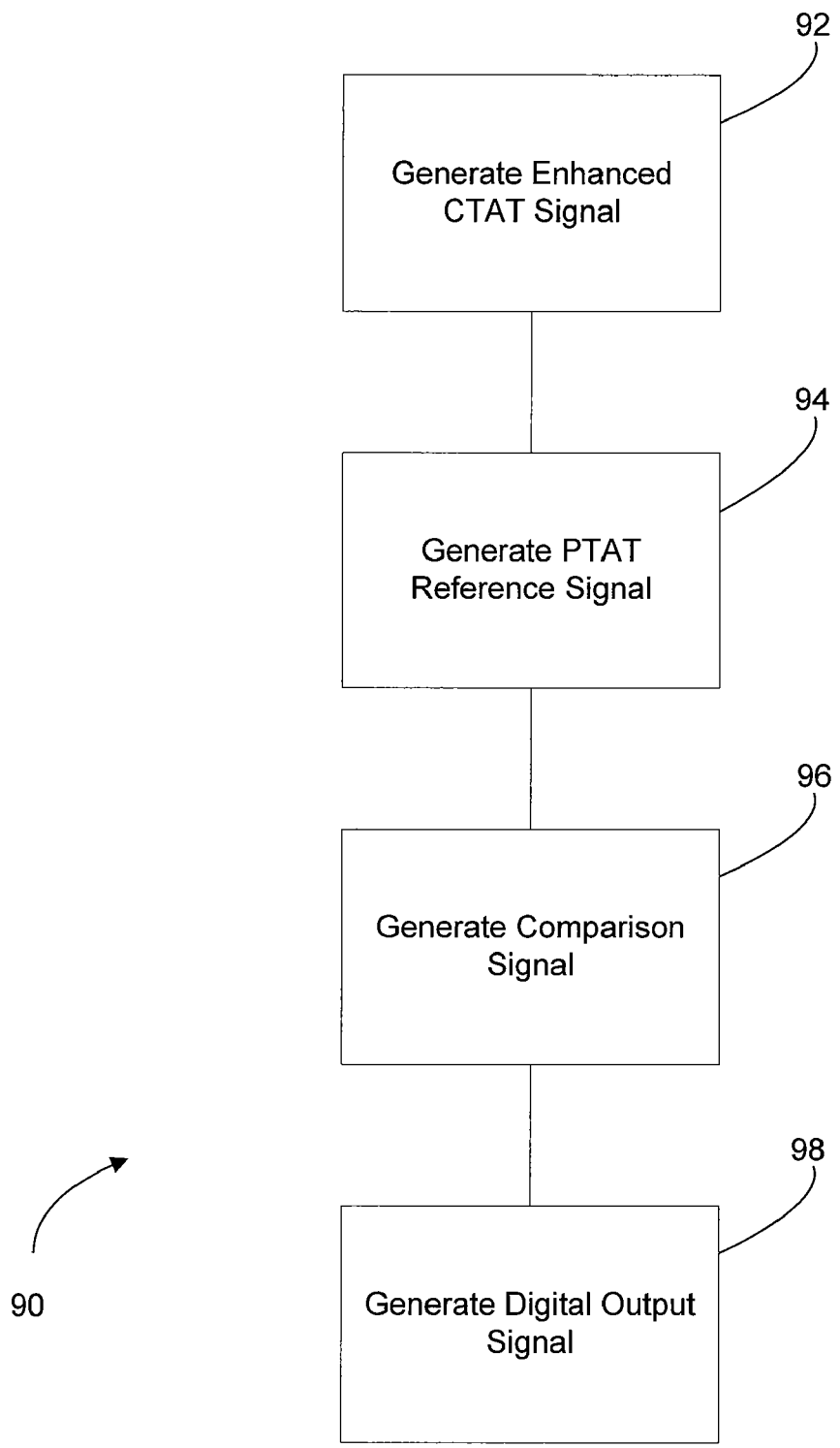
Figure 5C:
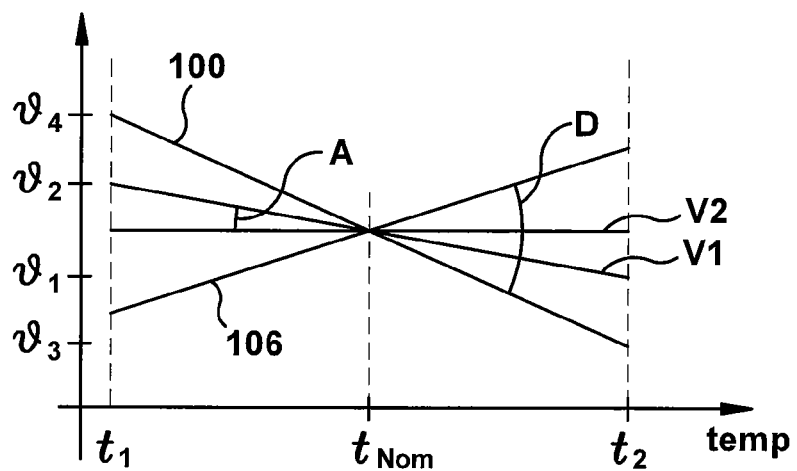

FIGS. 4c and 5c show a method of operating the sensor 50 and a voltage versus temperature characteristic graph in accordance with a yet further embodiment. The method 90 includes a step of generating 92 an enhanced complementary to absolute temperature (CTAT) voltage signal 100 using the temperature dependent circuit 52. In this embodiment, preferably, the temperature dependent circuit 52 includes a pair of stacked diodes for generating the enhanced CTAT voltage signal in a manner to be described in greater detail below. Using the reference signal circuit 56, a temperature dependent reference signal 106 is generated at step 94. In this embodiment, preferably, the reference signal 106 varies proportionally to the absolute temperature (PTAT) of the sensor 50. In step 96, using the comparator 60, a comparison signal is generated based on a comparison between the enhanced CTAT voltage signal 100 and PTAT reference signal 106. A digital output signal representative of the temperature of the sensor 50 is generated at step 98 based on the comparison signal.

As shown best FIG. 5c, in general, the enhanced CTAT voltage signal 100 varies substantially linearly with changes in temperature and, more particularly, decreases for temperature increases. The negative slope of the enhanced CTAT voltage signal 100 of this embodiment is about 700 mV over about 150° C. or about −4.6 mV/° C. Also, the PTAT reference signal 106 varies substantially linearly with changes in temperature and, more particularly, increases with temperature increases. The positive slope of the PTAT reference voltage signal 106 of this embodiment is about 200-300 mV over about 150° C. or about +1.6 mV/° C.

FIG. 5c shows the enhanced CTAT voltage signal 100 overlaid with the standard CTAT voltage signal V1 of the prior art and the PTAT reference signal 106 overlaid with the standard fixed reference voltage signal V2 of the prior art. As can be seen, in the illustrated prior art example, the temperature circuit 10 is operational in the box bounded by $v_1$, $v_2$, $t_1$, and $t_2$. However, in accordance with an embodiment of the present application, the temperature sensor 50 has an enhanced operational range to include at least the area bounded by the box $v_3$ $v_4$, $t_1$, and $t_2$. In addition, the angle of incidence D between the enhanced CTAT voltage signal 100 and the PTAT reference voltage signal 106 is significantly greater than the angle of incidence A in the prior art between the temperature dependent standard CTAT voltage signal V1 and the fixed reference voltage. This provides an improved sensitivity in the subject temperature sensor 50 and enhances its robustness for use in a wide range of applications.

Figure 6:
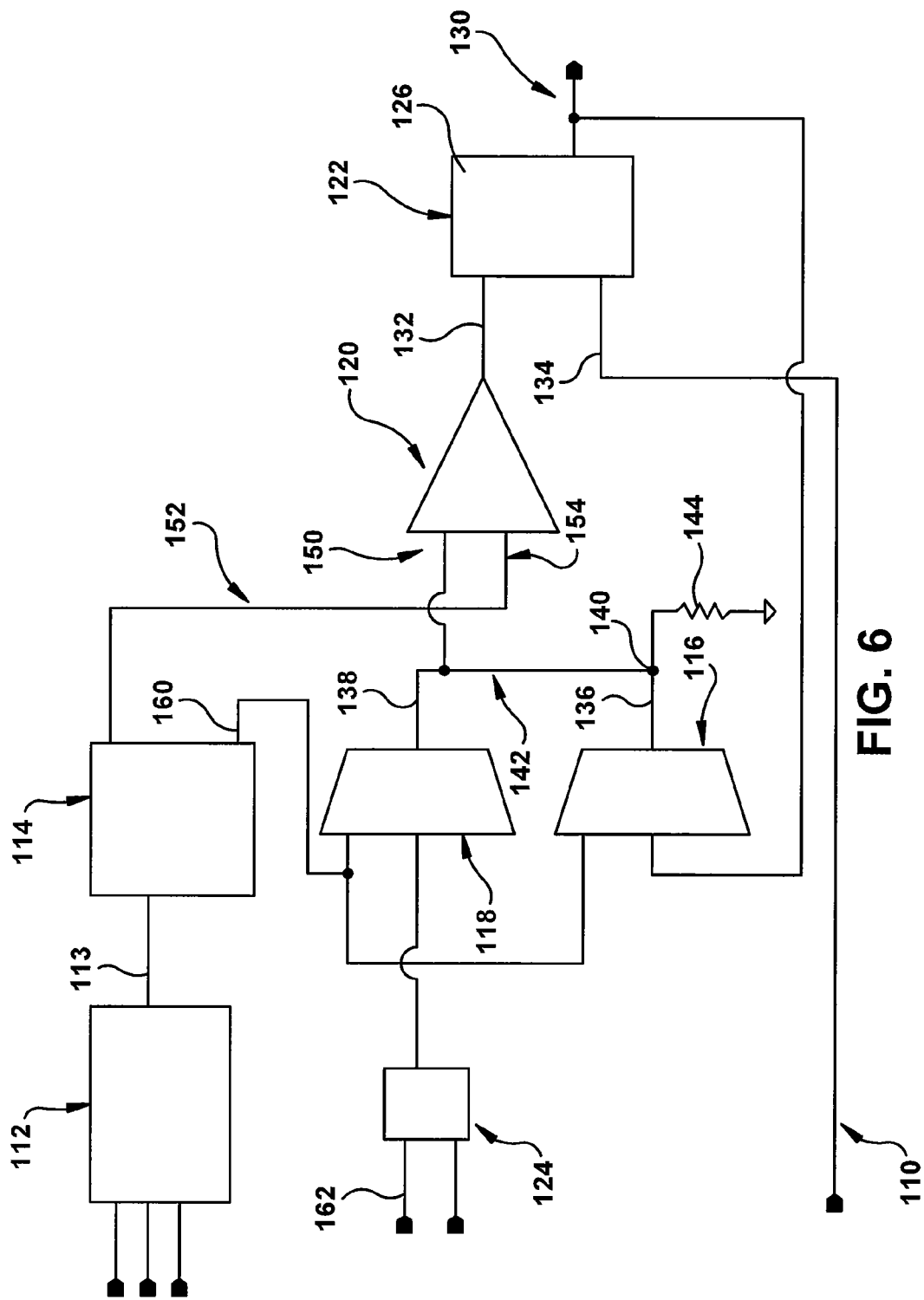
FIG. 6 is a circuit diagram of the temperature sensing system in accordance with an embodiment of the present invention.

FIG. 6 is a circuit diagram showing a digital output temperature sensor circuit 110 in accordance with an example embodiment. Turning now to FIG. 6, the sensor circuit 110 includes a low drop out power supply voltage regulator circuit 112 generating a power supply voltage signal 113, a reference voltage generator circuit 114, a pair of digital to analog converters (DACs) 116, 118, a comparator circuit 120, a counter circuit 122, and a latch circuit 124. Preferably, the DACs 116, 118 are identical or at least matched to have complimentary characteristics, behaviors, and function over the operating band.

In the embodiment illustrated, the counter circuit 122 is preferably a 6 bit up/down counter circuit 126 configured to generate a 6 bit digital output 130 based on counting up actions and counting down actions responsive to a pair of inputs received including an input from the comparator circuit 120 in the form of an up/down command signal 132 and a clock signal 134 received into the circuit 110 from an operatively associated external clock source (not shown). Essentially, the 6 bit digital output 130 is proportional to the temperature of the circuit. Preferably, the circuit is operable in a temperature range of −5° C. to +152.5° C. Thus, the resolution of the circuit in the example embodiment is about 2.5° C./LSB.

The 6 bit digital output signal 130 is configured to provide a digital feedback loop servicing a first DAC 116 for converting the digital signal 130 into a current output signal 136 at a node 140. The current output signal 136 is added together with a similar current output signal 138 originating from the second DAC 118 at the node 140 and the combined currents are converted into a feedback voltage signal 142 by a grounded resistor 144. In that way, the feedback voltage signal 142 may be presented at a first input 150 of the comparator 120.

At the digital level of the circuit 110, a CTAT voltage signal 152 is generated by the reference voltage generator circuit 114 in a manner to be described in greater detail below. The CTAT voltage signal 152 is compared at the second input 154 of the comparator 120 with the feedback voltage signal 142 at the first input 150 of the comparator 120. The up/down command signal 132 is generated based upon the comparison. In its preferred form, the up/down command signal 132 is a logical "1" when the CTAT voltage signal 152 is greater than the feedback voltage signal 142 and is a logical "0" when the CTAT voltage signal 152 is less than the feedback voltage signal 142. The counter circuit counts up or down accordingly.

It is to be appreciated, however, that in accordance with an example embodiment, the CTAT voltage signal 152 is compared against a PTAT reference signal rather than against a fixed reference voltage for improved accuracy and range of operation such as described above. In that regard, the reference voltage generator circuit 114 is configured to generate a PTAT reference signal 160 for use by the first and second DACs 116, 118 during their respective conversions of their digital inputs to current outputs. Essentially, the PTAT reference signal 160 biases the DACs 116, 118 to inherently include a temperature dependent characteristic in their respective outputs. The PTAT reference signal 160 is used to set the currents in the DACs 116, 118 in a manner to be described in greater detail below.

The second DAC 118 and the latch circuit 124 also comprise part of the digital feedback loop of the circuit 110. In its preferred form, the latch is a standard cell Q-latch for latching a digital offset signal 162 into the second DAC 118. The digital offset signal 162 is converted by the DAC to the current output signal 138 mentioned above. Thus, an offset contribution originating from the second DAC 118 at added to the feedback results at the node 140 and the combined currents are converted into a feedback voltage signal 142 by the grounded resistor 144. In that way, the feedback voltage signal 142 presented at a first input 150 of the comparator 120 may include a user selectable offset value as necessary or desired.

Figure 7:
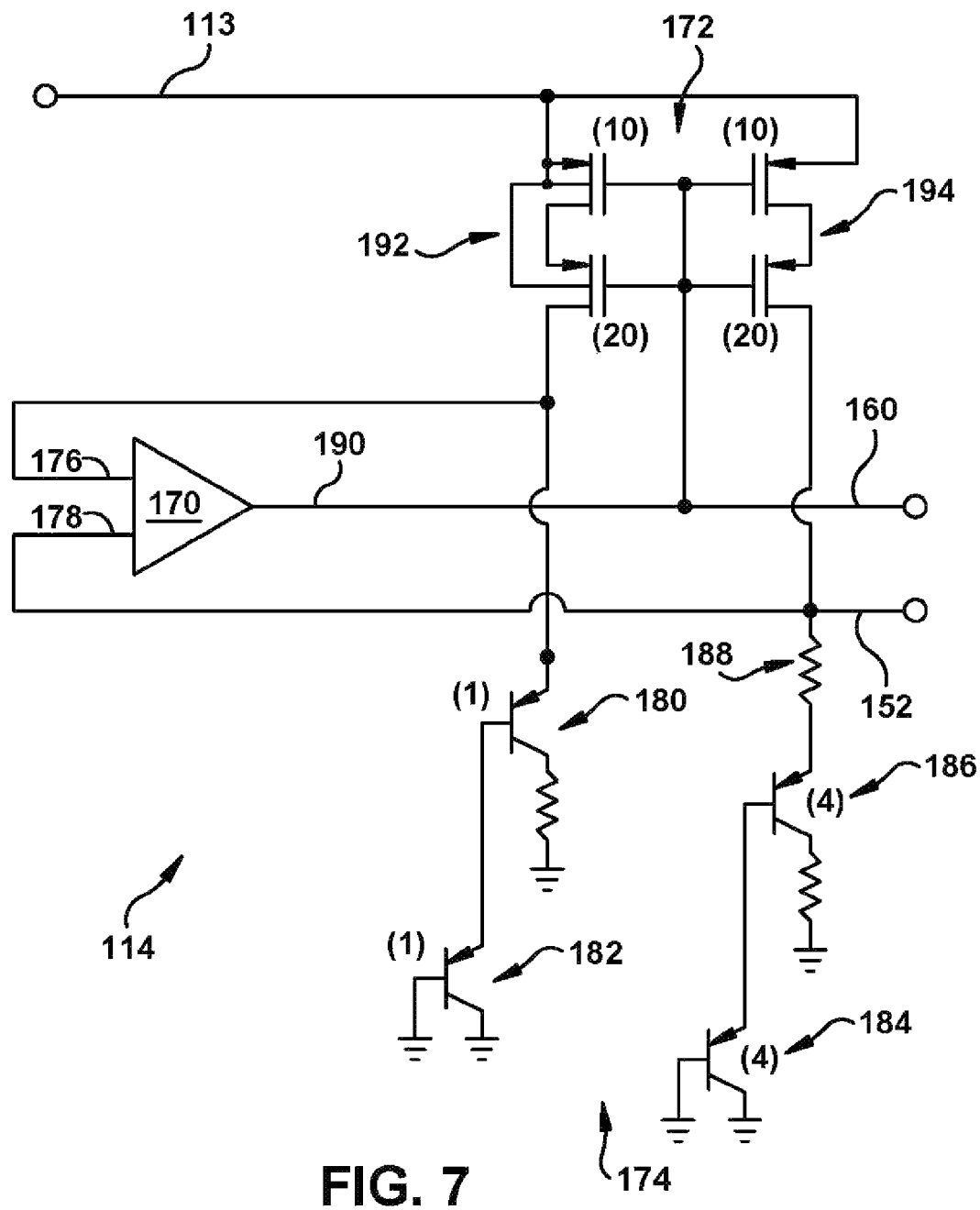
FIG. 7 is a detailed circuit diagram showing components of a portion of the circuit of FIG. 6.

FIG. 7 is a more detailed circuit diagram of the reference voltage generator circuit 114 of FIG. 6 configured to generate CTAT voltage signal 152 for the first input 154 of the comparator 120 and the PTAT reference signal 160 for use by the first and second DACs 116, 118 in setting their respective currents. The circuit 114 includes an op amp 170, a set of control P-type transistors 172 and a set of diode-connected PNP transistors 174. In one embodiment, the op amp 170 is a folded cascade op amp.

In one example embodiment, the circuit operates in a band gap mode of operation. In that regard, the $V_{be}$ threshold voltage of a first pair of bipolar transistors 180, 182 in series is communicated to a first input 176 of the op amp 170 and the $V_{be}$ threshold voltage of a second pair of bipolar transistors 184, 186 in series combined with a resistor 188 is communicated to a second input 178 of the op amp 170. The output signal 190 of the op amp 170 is communicated to first 192 and second 194 matched current sources formed by the set of control P-type transistors 172.

The op amp 170 attempts to establish an output wherein the first and second input signals 176, 178 are equal by varying the output signal 190. When the first and second input signals 176, 178 are controlled to match, the output signal 190 is proportional to the absolute temperature of the circuit 114 and of the sensor 110. In an embodiment, the output PTAT signal 190 is also used as an input 160 to control the currents flowing in the first and second DACs 116, 118 in a manner to be described in greater detail below. The $V_{be}$ threshold voltage of a pair of sets of bipolar transistors 184, 186 in series combined with a resistor 188 form an output signal 152 varying complementary to a temperature of the sensor. Essentially, a CTAT voltage signal 152 is generated. An enhanced CTAT voltage signal is generated because a pair of quad stacked diodes is used to generate the CTAT voltage signal. In one example embodiment, a first set of four (4) parallel grounded emitter PNP transistors 184 in series with a second set of four (4) parallel grounded emitter PNP transistors 186 is used and further in series with a resistor 188 to generate the CTAT voltage signal 152 as shown.

Figure 8:
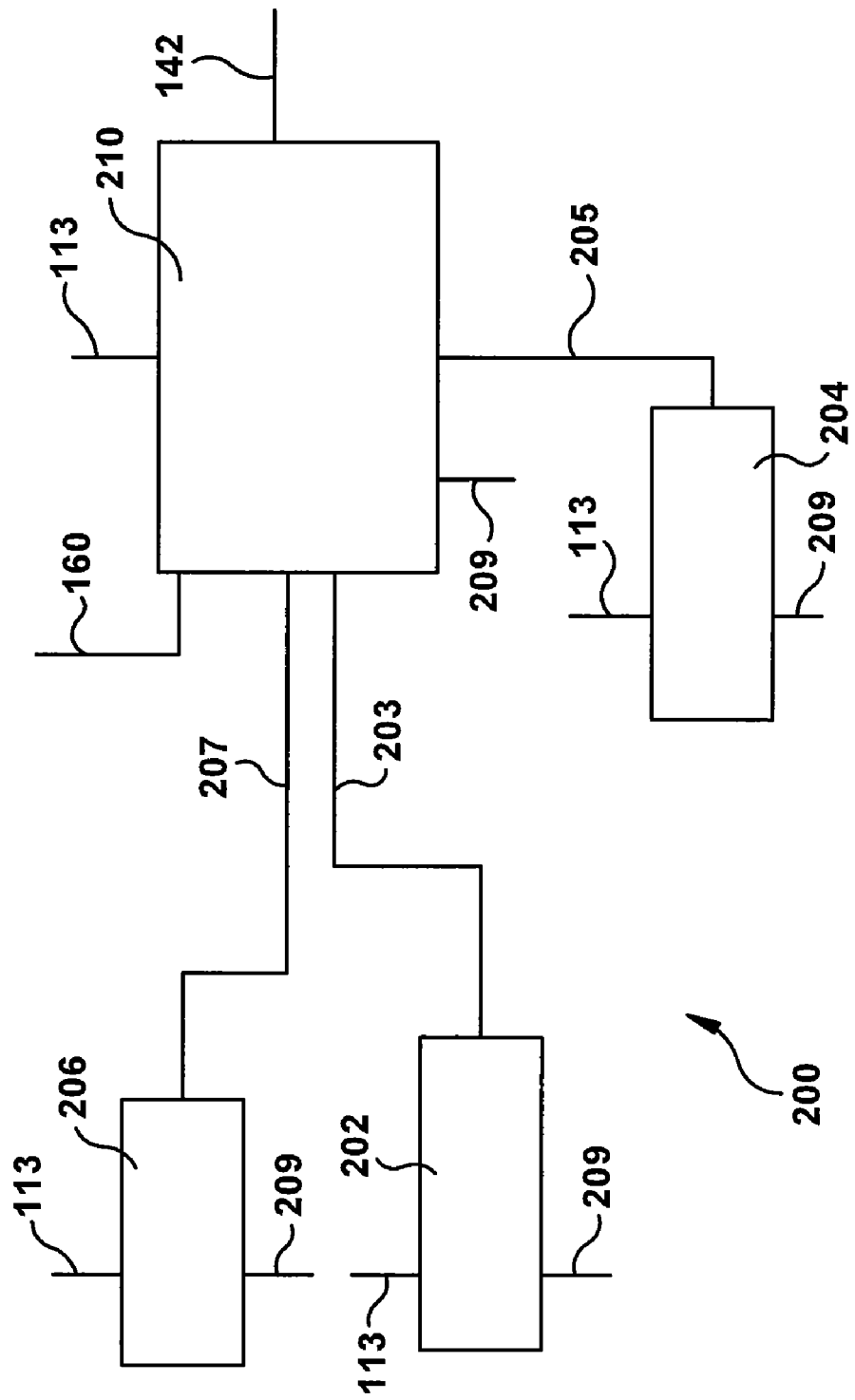
FIG. 8 is a detailed circuit block diagram showing components of another portion of the circuit of FIG. 6.

FIG. 8 shows an example digital to analog (DAC) circuit 200 provided in each of the DACs 116, 118 described above. The DAC circuit 200 includes a first thermometer decoder 202 for turning on the rows in a core array 210 using a signal 203, a second thermometer decoder 204 for turning on the columns in the core array 210 using a signal 205, and a row decoder 206 generating a row decoder signal 207 for decoding rows in the core array 210. Each of the first and second thermometer decodes 202, 204, the row decoder 207 and the core array receive power from a power signal 209 such as shown. In addition, as shown, the core array 210 is configured to receive the PTAT reference signal 160.

Figure 9:
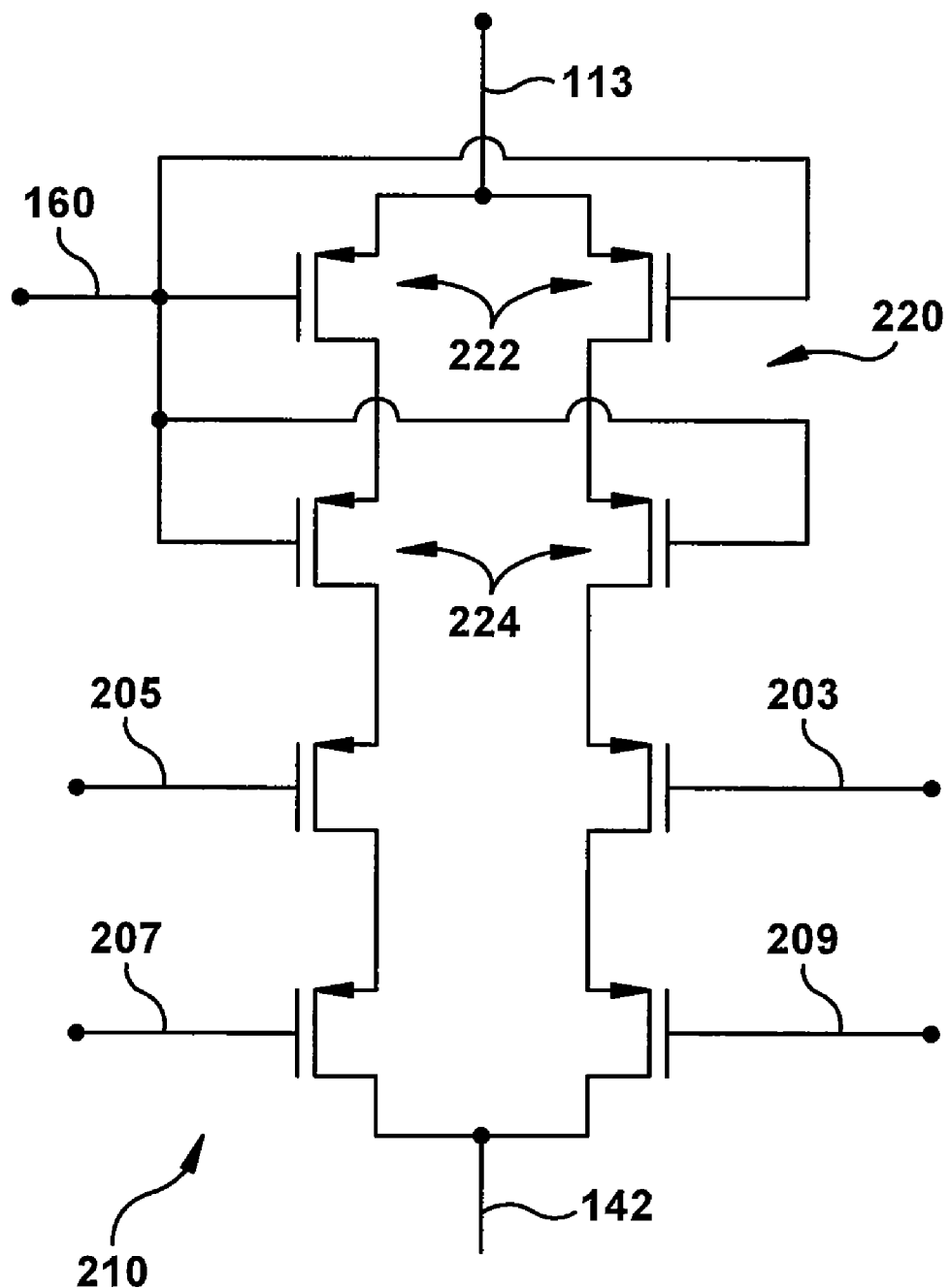
FIG. 9 is a detailed circuit diagram showing components of the core array of FIG. 8.

FIG. 9 is a circuit diagram showing details of a set of transistors 220 used in the core array 210 of FIG. 8. A first pair of transistors 222 are connected in parallel and are controlled by the PTAT reference signal 160. Similarly, a second pair of transistors 224 are connected in parallel and are controlled by the PTAT reference signal 160. On one embodiment, all of the transistors 222, 224 function as cascode $V_{ds}$ controlled transistors and, in the configuration shown, use the PTAT reference signal 160 to set the partial currents in the core array 210 so that the output signal 142 presented at node 140 (FIG. 6) is a signal proportional to the temperature of the sensor. However, in another embodiment, linearity of the DACs 116, 188 over a temperature range is improved by selectively adjusting a length of the first pair of transistors 222. In one preferred embodiment, the length of the transistors used in the core array is controlled to effect a better control of the current per bit of the core array 210. Specifically, the length of the first pair of transistors 222 is varied from a standard length of about 800 nm. The length of the second pair of transistors 224 has a standard length of about 400 nm. Each of the first and second pairs of transistors 222, 224 has a nominal width of about 4 um.

Figure 10:
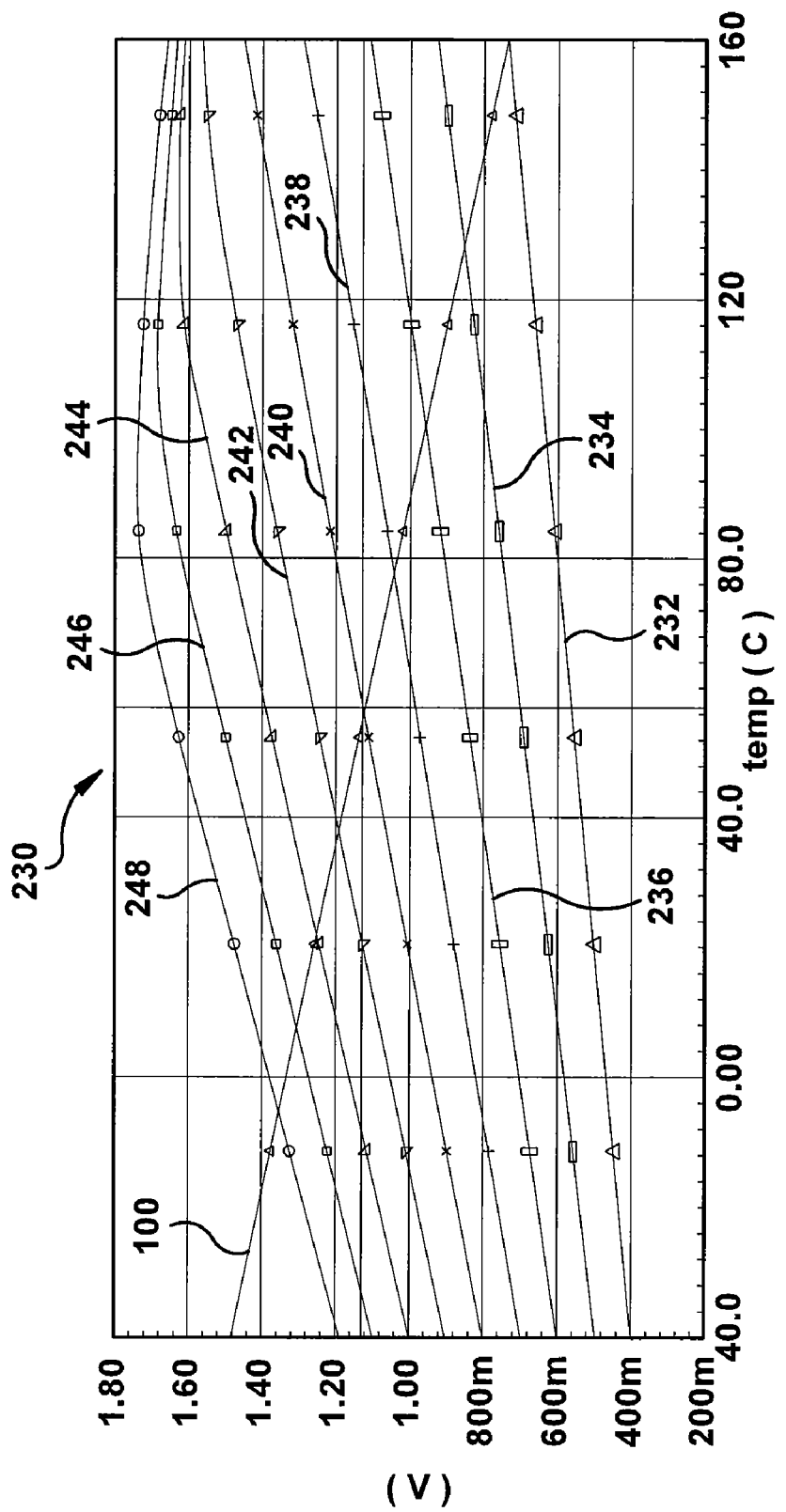
FIG. 10 is a graph showing performance characteristic curves for an uncompensated DAC.
Figure 11:
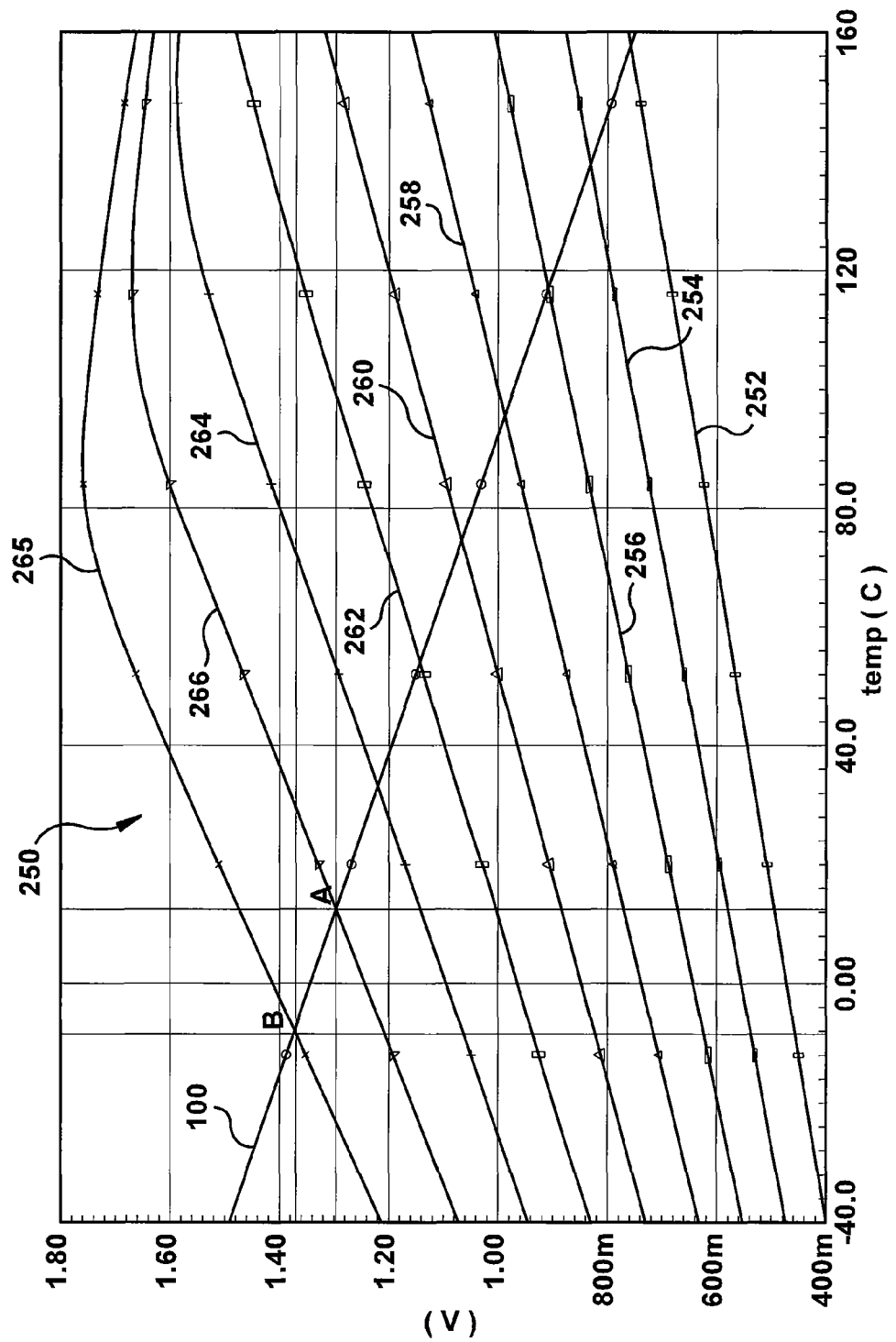
FIG. 11 is a graph showing performance characteristic curves for a compensated DAC.

In one preferred embodiment the length of the current source transistors 222 are varied from about 1.3 um for high temperature operating conditions of the sensor to about 0.45 um for low temperature operating conditions to produce a more uniform 2.5° C. temperature delta per output code change such as, for example, an output code change from 000000 to 000001 representing a temperature change from 152.5° C. to 150.0° C. At high temperatures the current change and reference voltage is preferably less than nominal thus the DAC current source transistors that are turned on for the high temp need to be longer to reduce the current sourced through the transistors. Conversely, for the low temperature operating regions, the current change and reference voltage is preferably greater than nominal thus the DAC current source transistors that are turned on for the low are preferably shorter to increase the current sourced through the transistors. In a DAC circuit having current sources with a uniform length, the change in temperature per code change at the high temperatures would be about 1.5° C. and the temperature per code change for low temperatures would be about 3.5° C. This is due to the change in slope of the PTAT voltages versus the number of active current sources wherein a representative uniform current source length representative performance characteristic is shown in FIG. 10 and a varied current source length representative performance characteristic is shown in FIG. 11. It is to be appreciated that the width of the current source transistors 222 may be varied while holding the lengths thereof substantially fixed or uniform throughout the array, or both the lengths and widths may be varied as desired or necessary to achieve the above described effects.

FIG. 10 illustrates a set of curves 230 representative of the voltages at node 140 over a temperature range for selected output conditions of the DACs 116, 118 in an uncompensated configuration wherein each of the transistor pairs 222, 224 are selectively formed having the same length, preferably about 400 nm. A first curve 232 is representative of the voltage at node 140 over a temperature range of the sensor for an output condition of 000000 for the first DAC 116 and an output of a nominal offset value derived from the second DAC 118. A second curve 234 is representative of the voltage at node 140 over a temperature range of the sensor for an output condition of 001000 for the first DAC 116 together with the output of the nominal offset value derived from the second DAC 118. Each successive curve 236-248 represents the voltage at node 140 over a temperature range of the sensor for output conditions of the first DAC 116 incremented by a plus eight (+8) and including a curve 248 wherein the DAC is set to 111111 together with the output of the nominal offset value derived from the second DAC 118. Although the curves slope to converge at a temperature of absolute zero (not shown), the curves are substantially linear in the operating region of the sensor (−5° C.-155° C.) and, therefore, satisfactory results are obtained. In this embodiment, the spacing between the intercept points between the CTAT signal 100 and the PTAT curves reduces slightly within reasonable limits as temperature increases.

FIG. 11 illustrates a set of curves 250 representative of the voltages at node 140 over a temperature range for selected output conditions of the DACs 116, 118 in a compensated configuration for enhanced linearity wherein each of the first pair of transistors 222 are selectively formed having a different length than each of the second pair of transistors 224. In the example embodiment, the first pair of transistors 222 are selectively formed having a different length longer than each of the second pair of transistors 224. In one example, the first pair of transistors 222 have a length of about 800 nm. And the second pair of transistors have a length of about 400 nm. A first curve 252 is representative of the voltage at node 140 over a temperature range of the sensor for an output condition of 000000 for the first DAC 116 and an output of a nominal offset value derived from the second DAC 118. A second curve 254 is representative of the voltage at node 140 over a temperature range of the sensor for an output condition of 001000 for the first DAC 116 together with the output of the nominal offset value derived from the second DAC 118. Each successive curve 256-268 represents the voltage at node 140 over a temperature range of the sensor for output conditions of the first DAC 116 incremented by a plus eight (+8) and including a curve 268 wherein the DAC is set to 111111 together with the output of the nominal offset value derived from the second DAC 118. In this embodiment, the spacing between the intercept points between the CTAT signal 100 and the PTAT curves remains substantially constant as temperature increases.

Thus, overall, the circuit continuously produces a 6 bit digital code inversely proportional to the temperature of the area of the IC where the temperature sensor is placed. The temperature range covered is from −5 degrees C. to 155 degrees C.

What has been described above includes example implementations of the embodiments. It is, of course, not possible to describe every conceivable combination of components or methodologies for purposes of describing the embodiments, but one of ordinary skill in the art will recognize that many further combinations and permutations are possible. Accordingly, it is intended to embrace all such alterations, modifications and variations that fall within the spirit and scope of the appended claims interpreted in accordance with the breadth to which they are fairly, legally and equitably entitled.

The invention claimed is:

1. A digital output temperature sensor comprising:
a first circuit configured to generate a first signal, the first signal varying complementary to a temperature of the sensor;
a second circuit configured to generate a second signal, the second signal varying proportionally to the temperature of the sensor, the second circuit comprising:
i) a PTAT current control reference voltage generating circuit configured to generate a PTAT current control reference voltage signal;
ii) a digital to analog converter circuit including a plurality of current sources receiving the PTAT current control reference voltage signal and being selectively switchable between a conductive state and a non-conductive state, wherein each of the plurality of current sources in the conductive state sources a partial current;
iii) a current summing junction summing each of the plurality of partial currents as a PTAT current signal; and
iv) a circuit component configured to convert the PTAT current signal to a PTAT voltage signal as the second signal;
a comparator operatively associated with the first and second circuits and configured to receive the first and second signals and generate a comparison signal based on a comparison between the first and second signals; and,
a converter circuit operatively associated with the comparator and configured to receive the comparison signal and generate a digital output signal based on the comparison signal, the digital output signal being representative of the temperature of the sensor.

2. The digital output temperature sensor of claim 1 wherein:
the first circuit is a reference voltage generator circuit including a pair of stacked diodes configured to generate a complementary to absolute temperature (CTAT) voltage signal as said first signal; and,
the converter circuit is configured to receive the comparison signal and generate the digital output signal proportional to an absolute temperature of the sensor.

3. The digital output temperature sensor of claim 2 wherein the pair of stacked diodes is a pair of grounded emitter PNP transistors.

4. The digital output temperature sensor of claim 1 wherein:
the first circuit is configured to generate a complementary to absolute temperature (CTAT) voltage signal as said first signal; and
the converter circuit is configured to receive the comparison signal and generate the digital output signal proportional to an absolute temperature of the sensor, the converter circuit including a counter circuit configured to count clock pulses of an associated clock signal as said digital output signal in response to said comparison signal.

5. The digital output temperature sensor of claim 1:
wherein: the first circuit is configured to generate a complementary to absolute temperature (CTAT) voltage signal as said first signal; and, the converter circuit is configured to receive the comparion signal and generate the digital output signal proportional to an absolute temperature of the sensor; and,
further comprising an offset adjustment circuit operatively associated with the second circuit and the comparator circuit, the offset adjustment circuit being configured to selectively generate an offset current signal and being operatively coupled with the second circuit and the comparator circuit for adding the offset current signal with the PTAT current signal.

6. A digital output temperature sensor comprising:
a reference voltage generator circuit configured to generate a first signal varying complimentary to a temperature of the sensor, the reference voltage generator circuit comprising a pair of stacked diodes configured to generate a complementary to absolute temperature (CTAT) voltage signal as said first signal;
a second circuit configured to generate a proportional to absolute temperature (PTAT) current signal varying proportionally to the temperature of the sensor as a second signal, the second circuit including: i) a PTAT current control reference voltage generating circuit configured to generate a PTAT current control reference voltage signal; ii) a digital to analog converter circuit including a plurality of current sources receiving the PTAT current control reference voltage signal and being selectively switchable between a conductive state and a non-conductive state, wherein each of the plurality of current sources in the conductive state sources a partial current;

iii) a current summing junction summing each of the plurality of partial currents as said PTAT current signal; and iv) a resistor between the current summing junction and a ground, the resistor being configured to convert the PTAT current signal to a PTAT voltage signal for use by said comparator;

a comparator operatively associated with the first and second circuits and configured to receive the first and second signals and generate a comparison signal based on a comparison between the first and second signals; and, a converter circuit operatively associated with the comparator and configured to receive the comparison signal and generate a digital output signal based on the comparison signal, the digital output signal being proportional to an absolute temperature of the sensor.

7. The digital output temperature sensor of claim 6 wherein:

each of the plurality of current sources is configured to generate PTAT partial currents, the plurality of current sources including current source transistors having varied lengths for adjusting a linearity of the digital to analog converter circuit over a range of temperatures of the sensor; and, the current summing junction is configured to sum each of the plurality of partial PTAT currents as said PTAT current signal.

8. The digital output temperature sensor of claim 6 wherein:

the first circuit comprises a reference voltage generator circuit including a pair of grounded emitter PNP transistors;

the plurality of current sources comprise current source transistors having varied lengths for adjusting a linearity of the digital to analog converter circuit over a range of temperatures of the sensor; and, the converter circuit comprises a counter circuit configured to count clock pulses of an associated clock signal as said digital output signal in response to said comparison signal.

9. A method in a temperature sensor of sensing a temperature, the method comprising:

generating a first signal varying complementary to a temperature of the sensor;

generating a second signal varying proportionally to the temperature of the sensor by:

i) using a PTAT current control reference voltage generating circuit, generating a PTAT current control reference voltage signal;

ii) using a digital to analog converter circuit including a plurality of current sources receiving the PTAT current control reference voltage signal and being selectively switchable between a conductive state and a non-conductive state, sourcing a partial current by each of the plurality of current sources in the conductive state;

iii) using a current summing junction, summing each of the plurality of partial currents as a PTAT current signal; and iv) converting the PTAT current signal to a PTAT voltage signal as the second signal;

generating a comparison signal based on a comparison between the first and second signals; and, generating a digital output signal based on the comparison signal, the digital output signal being representative of the temperature of the sensor.

10. The method of claim 9 wherein:

the generating the first signal comprises generating, using a pair of stacked diodes, a complementary to absolute temperature (CTAT) voltage signal as said first signal; and, the generating the digital output signal comprises generating the digital output signal proportional to an absolute temperature of the sensor.

11. The method of claim 10 wherein the generating the complementary to absolute temperature (CTAT) voltage signal comprises generating the complementary to absolute temperature (CTAT) voltage signal using a pair of grounded emitter PNP transistors.

12. The method of claim 9 wherein:

the generating the first signal comprises generating a complementary to absolute temperature (CTAT) voltage signal as said first signal; and, the generating the digital output signal comprises generating the digital output signal proportional to an absolute temperature of the sensor by counting clock pulses of an associated clock signal using a counter circuit in response to said comparison signal.

13. The method of claim 9:

wherein: the generating the first signal comprises generating a complementary to absolute temperature (CTAT) voltage signal as said first signal; the generating the second signal includes generating a proportional to absolute temperature (PTAT) current signal as said second signal; and, the generating the digital output signal includes generating the digital output signal proportional to an absolute temperature of the sensor; and, further comprising selectively generating an offset current signal for adding the offset current signal with the PTAT current signal.

14. A method in a temperature sensor of sensing a temperature, the method comprising:

generating a first signal varying complementary to a temperature of the sensor, the generating the first signal comprising generating a complementary to absolute temperature (CTAT) voltage signal as said first signal;

generating a second signal varying proportionally to the temperature of the sensor, the generating the second signal comprising generating a proportional to absolute temperature (PTAT) current signal as said second signal by: i) using a PTAT current control reference voltage generating circuit, generating a PTAT current control reference voltage signal; ii) using a digital to analog converter circuit including a plurality of current sources receiving the PTAT current control reference voltage signal and being selectively switchable between a conductive state and a non-conductive state, sourcing a partial current by each of the plurality of current sources in the conductive state; iii) using a current summing junction, summing each of the plurality of partial currents as said PTAT current signal; and iv) using a resistor between the current summing junction and a ground, converting the PTAT current signal to a PTAT voltage signal as the second signal;

generating a comparison signal based on a comparison between the first and second signals; and, based on the comparison signal, generating a digital output signal representative of the temperature of the sensor, the generating the digital output signal comprising generating the digital output signal proportional to an absolute temperature of the sensor.

15. The method of claim 14 wherein:
the generating the partial current by each of the plurality of current sources in the conductive state comprises generating PTAT partial currents by each of the plurality of current sources in the conductive state by transistors having varied lengths for adjusting a linearity of the digital to analog converter circuit over a range of temperatures of the sensor; and,
the summing each of the plurality of partial currents as said PTAT current signal using the current summing junction comprises summing each of the plurality of partial PTAT currents as said PTAT current signal.

16. A method in a temperature sensor of sensing a temperature, the method comprising:
generating a first signal varying complementary to a temperature of the sensor, the generating the first signal comprising generating a complementary to absolute temperature (CTAT) voltage signal as said first signal using a pair of grounded emitter PNP transistors;
generating a second signal varying proportionally to the temperature of the sensor, the generating the second signal comprising generating a proportional to absolute temperature (PTAT) current signal by counting clock pulses of an associated clock signal as said digital output signal in response to said comparison signal as said second signal;
generating a comparison signal based on a comparison between the first and second signals; and,
based on the comparison signal, generating a digital output signal representative of the temperature of the sensor, the generating the digital output signal comprising generating the digital output signal proportional to an absolute temperature of the sensor by: i) using a PTAT current control reference voltage generating circuit, generating a PTAT current control reference voltage signal; ii) using a digital to analog converter circuit including a plurality of current sources receiving the PTAT current control reference voltage signal and being selectively switchable between a conductive state and a non-conductive state, sourcing a partial current by each of the plurality of current sources in the conductive state; iii) using a current summing junction, summing each of the plurality of partial currents as said PTAT current signal; and iv) using a resistor between the current summing junction and a ground, converting the PTAT current signal to a PTAT voltage signal, wherein the generating the PTAT partial currents by each of the plurality of current sources in the conductive state comprises generating the PTAT partial currents by transistors having varied lengths for adjusting a linearity of the digital to analog converter circuit over a range of temperatures of the sensor.

* * * * *